United States Patent
Hanson

(10) Patent No.: US 9,238,400 B2
(45) Date of Patent: Jan. 19, 2016

(54) ZIPPER LESS REMOVABLE WINDOWS FOR A FOLDING SUV SOFT TOP

(71) Applicant: Magna International Inc., Aurora (CA)

(72) Inventor: Eric John Hanson, Dearborn, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 14/222,156

(22) Filed: Mar. 21, 2014

(65) Prior Publication Data

US 2014/0284959 A1 Sep. 25, 2014

Related U.S. Application Data

(60) Provisional application No. 61/804,471, filed on Mar. 22, 2013.

(51) Int. Cl.
*B60J 1/18* (2006.01)
*B60J 7/10* (2006.01)
*B60J 1/00* (2006.01)
*B60J 1/08* (2006.01)

(52) U.S. Cl.
CPC .. *B60J 7/10* (2013.01); *B60J 1/004* (2013.01); *B60J 1/085* (2013.01); *B60J 1/1807* (2013.01)

(58) Field of Classification Search
CPC ............... B60J 1/18; B60J 7/10; B60J 1/004; B60J 1/085; B60J 1/1807
See application file for complete search history.

(56) References Cited

U.S. PATENT DOCUMENTS

| 6,015,181 A * | 1/2000 | Exner ........................... 296/145 |
| 6,827,391 B1 * | 12/2004 | Kohn et al. .............. 296/146.14 |
| 2014/0138983 A1 | 5/2014 | Haberkamp et al. |

\* cited by examiner

*Primary Examiner* — Glenn Dayoan
*Assistant Examiner* — Melissa A Black
(74) *Attorney, Agent, or Firm* — Warn Partners, P.C.

(57) ABSTRACT

A zipper less removable window system having removable windows for use with a foldable, stowable roof for a vehicle. A plurality of attachment devices of the zipper less removable window system connect the windows to the foldable, stowable roof and to the vehicle without the use of zippers. The operator zipper effort caused by traditional windows is thereby eliminated and misalignment issues present with traditional zippered windows is eliminated or reduced. The stress placed on the portions of the windows connectable to the foldable roof during installation and removal, including around curved portions of the removable window, is eliminated or reduced.

20 Claims, 13 Drawing Sheets

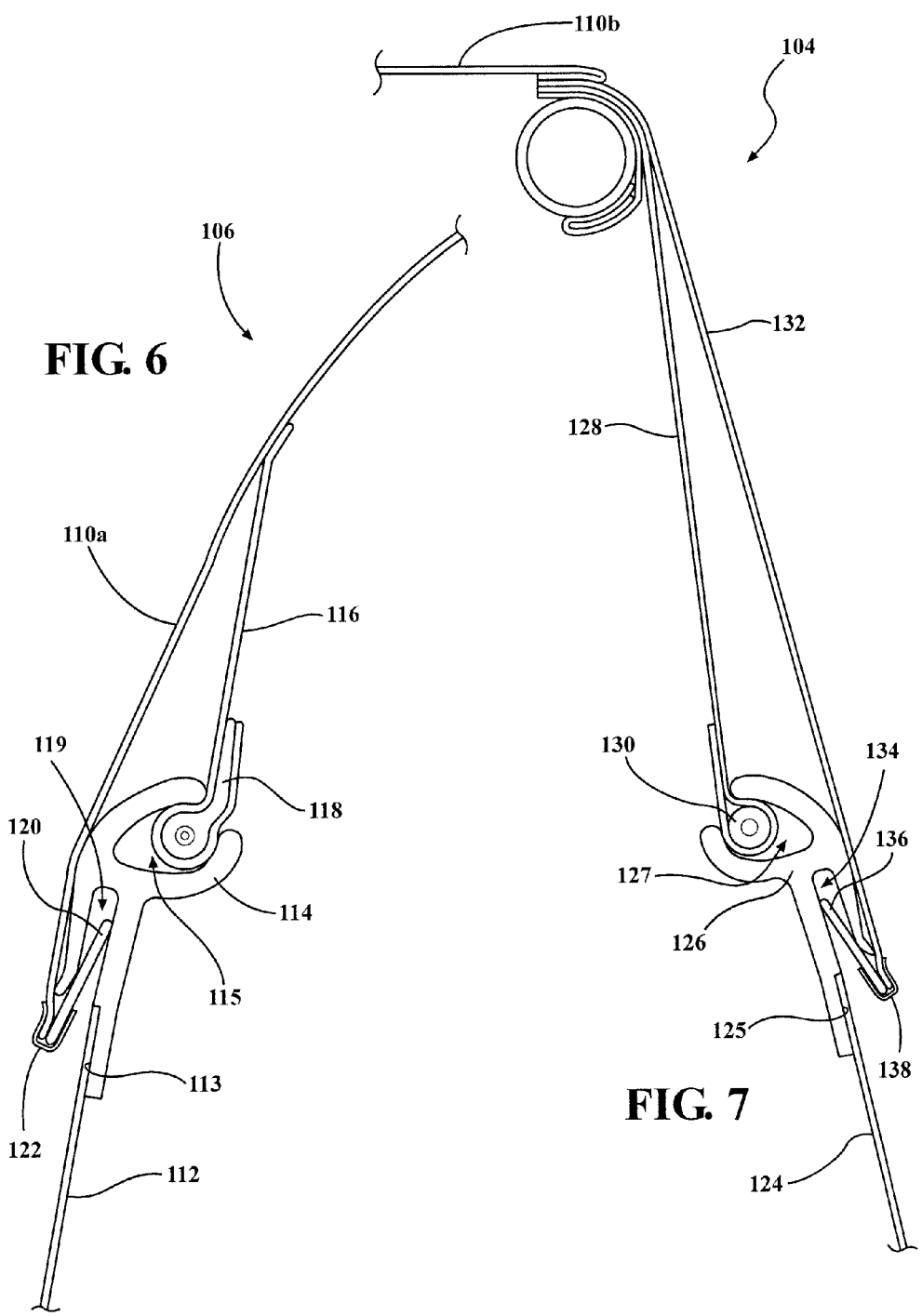

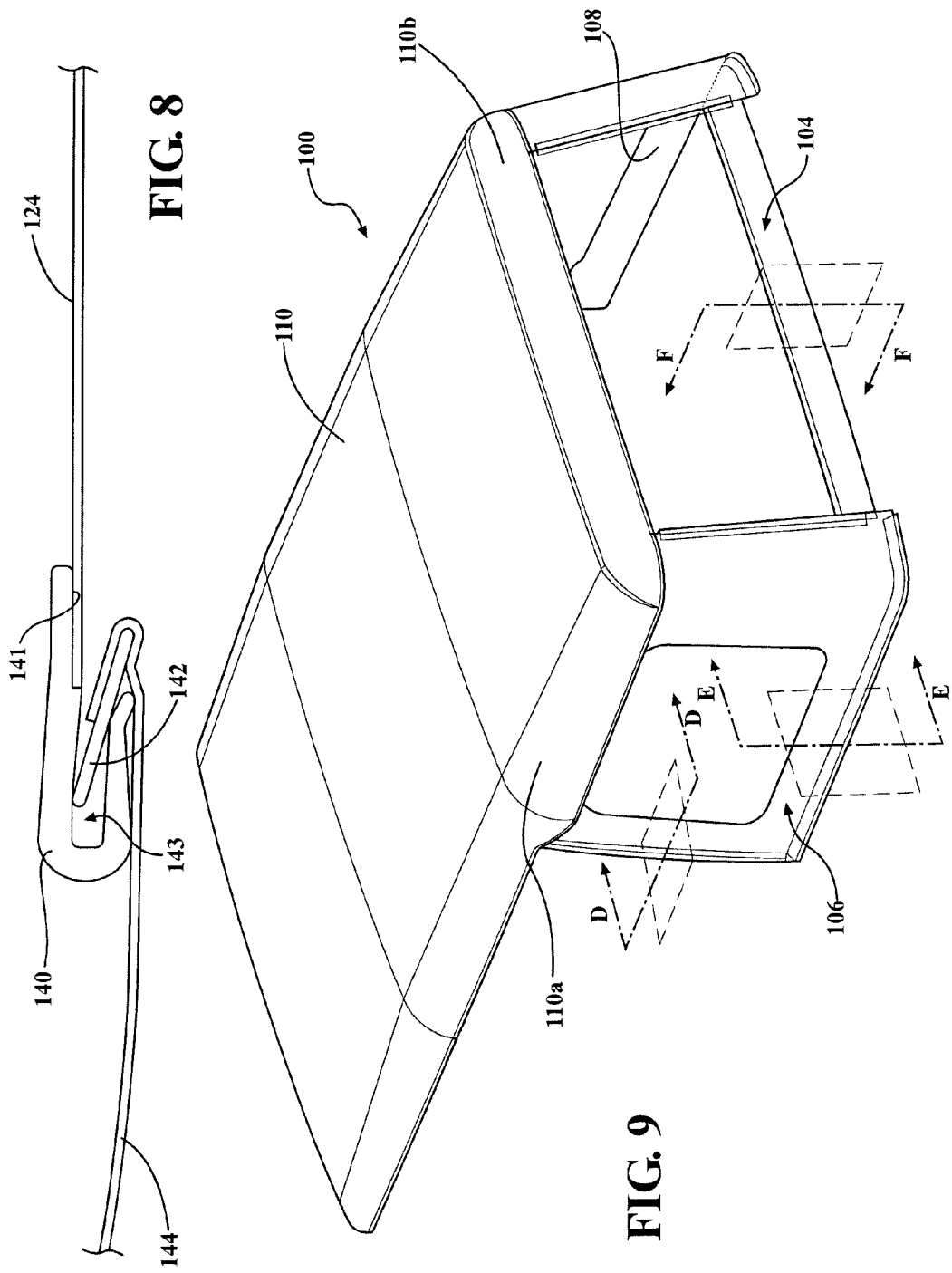

ZIPPER LESS REMOVABLE WINDOWS FOR A FOLDING SUV SOFT TOP

CROSS-REFERENCE TO RELATED APPLICATIONS

This application claims the benefit of U.S. Provisional Application No. 61/804,471, filed Mar. 22, 2013. The disclosure of the above application is incorporated herein by reference

FIELD OF THE INVENTION

The present invention is directed to a window attachment system suited for selectively connecting removable windows to a foldable roof of a foldable, stowable roof.

BACKGROUND OF THE INVENTION

Foldable stowable roof tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. It is also sometimes desirable to open these clear window sections when weather conditions are favorable, but the occupant(s) of the vehicle may not desire to change the foldable roof to the stowed position.

Because these window sections are also foldable and/or removable, typical window crank devices and electric motors used for opening and closing a window made of glass (which is rigid and not foldable) are not suitable for use with a foldable roof. Therefore, other methods of opening the foldable window have been developed.

One of these methods is a zipper which is typically one continuous zipper that surrounds all sides of the window but one. The one side of the window which is not surrounded by the zipper is the foldable side, allowing the window to be folded from the closed to the open position. One of the drawbacks to this type of design is that typical zippers are designed for connecting two sheets of material along a substantially straight surface. These zippers are difficult to align and misalignment results in higher zipper effort. In addition, both sides of the zipper are in the same plane and the difference between the radius of the outer window connected to the zipper and the radius of the foldable roof connected to the zipper is typically the width of the zipper. This makes the zipper difficult to use around the corners of the window because there is an imbalanced amount of stress placed on the portion of the zipper connected to the window and the portion of the zipper connected to the foldable roof. Another one of the drawbacks is that the window is not removable, which necessitates clear, foldable, window sections that must be folded and secured out of the way taking up space within the vehicle and can create noise from vibrating in the wind when the vehicle is moving.

Another of these methods for opening the window is employing a removable window. Current soft windows are attached to the soft top via zippers. These prove to be quite cumbersome to use. It is difficult to align the zipper end into the box end of the corresponding zipper on the soft top. Secondly, the zipper can be difficult to close and/or open as the efforts can be quite high due to zipper misalignment between the soft top and window assembly. This is caused by manufacturing issues and/or tolerances such as in alignment during the sewing process that is used to attach the zippers to the soft top and windows. Misalignment can cause the zipper teeth to skip thereby making the zipping motion efforts high. Any variation of the zipper alignment can result in higher zipper efforts around at least the upper rear corner where the curved portion of the window is connectable to the roof resulting in installation difficulty of the window. Another issue from zipper teeth skipping and/or misalignment of zipper halfs is that this can cause the window to not be closed all the way resulting in gaps where water and air can enter the vehicle.

Accordingly, there exists a need for removable windows including zipper less attachments which are suitable for providing a selective connection between a foldable roof and the removable windows having various straight and curved areas.

SUMMARY OF THE INVENTION

The present invention is directed to a zipper less removable window assembly having window attachment devices for eliminating zippers for use with a foldable, stowable roof for a vehicle, where the foldable roof includes one or more removable windows made of a plastic material such as polyvinyl chloride (PVC). The window attachment devices are easier to use and reduce the stress/effort caused by conventional zippers which are difficult to operate.

The foldable, stowable roof is connected to a vehicle, and has at least one curved portion and at least one straight portion. Additionally, the removable window is also connected to the vehicle, and the removable window has at least one curved portion and at least one straight portion. The curved portion of the foldable, stowable roof generally corresponds to the shape of the curved portion of the removable window. The removable window comprises a plurality of attachment devices selectively connecting the foldable, stowable roof to the removable window. Each of the plurality of attachment devices is zipper less and has a first half connected to the foldable, stowable roof and a second half connected to the removable window. The plurality of window attachment devices connect the left side quarter window, right side quarter window, and rear window to the vehicle and the foldable, stowable roof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is an enlarged sectional view taken along section A-A of FIG. 5, according to the present invention;

FIG. 7 is an enlarged sectional view taken along section B-B of FIG. 5, according to the present invention;

FIG. 8 is an enlarged sectional view taken along section C-C of FIG. 5, according to the present invention;

FIG. 9 is a schematic for the vehicle of FIG. 5 incorporating zipper less removable quarter and rear windows, for selectively connecting a foldable roof and the removable windows showing additional cross sections, according to the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
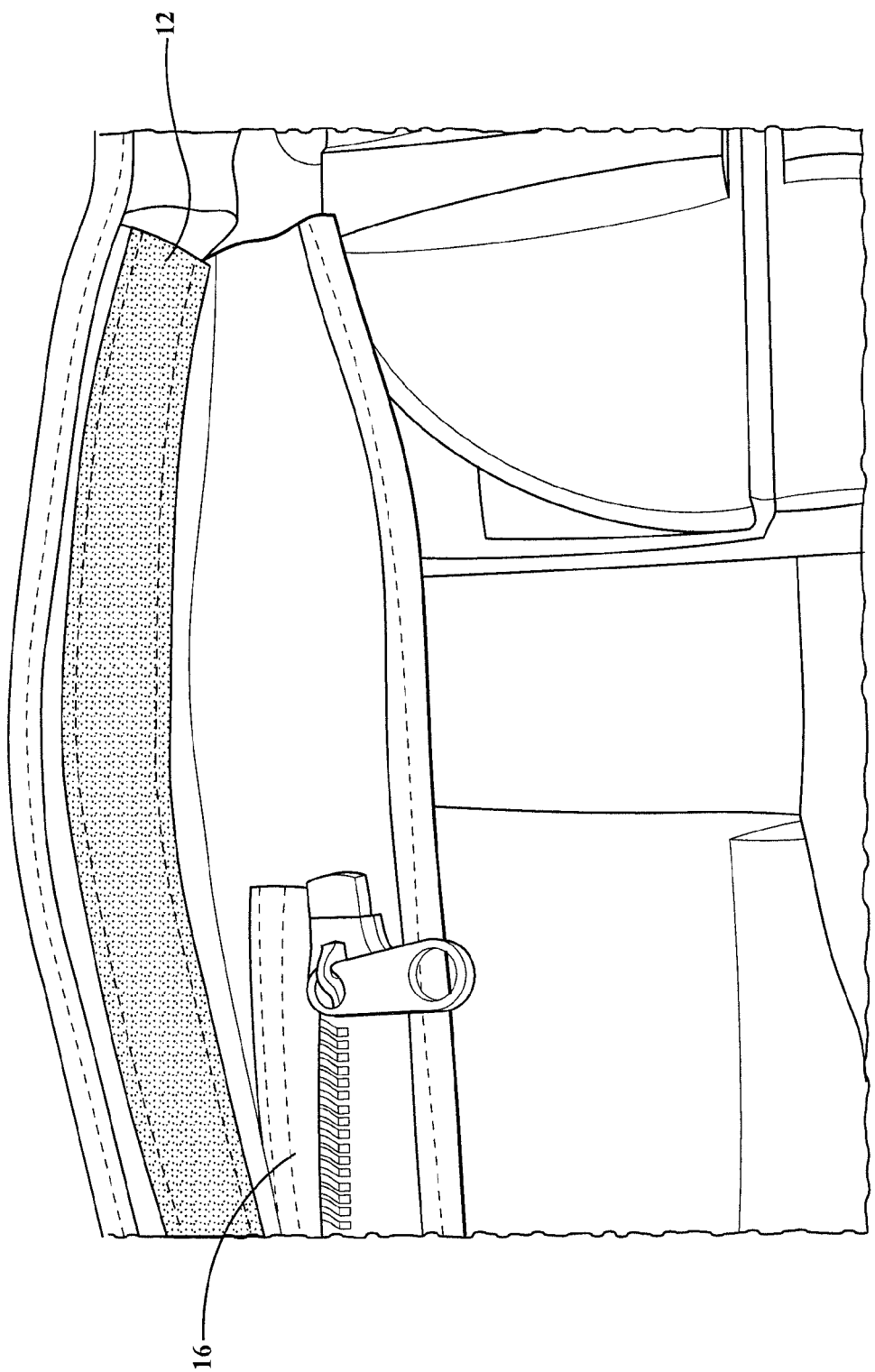
FIG. 1 is an elevation view of a first half of a zipper on a deck side strip connected to a foldable roof used for a window.
Figure 2:
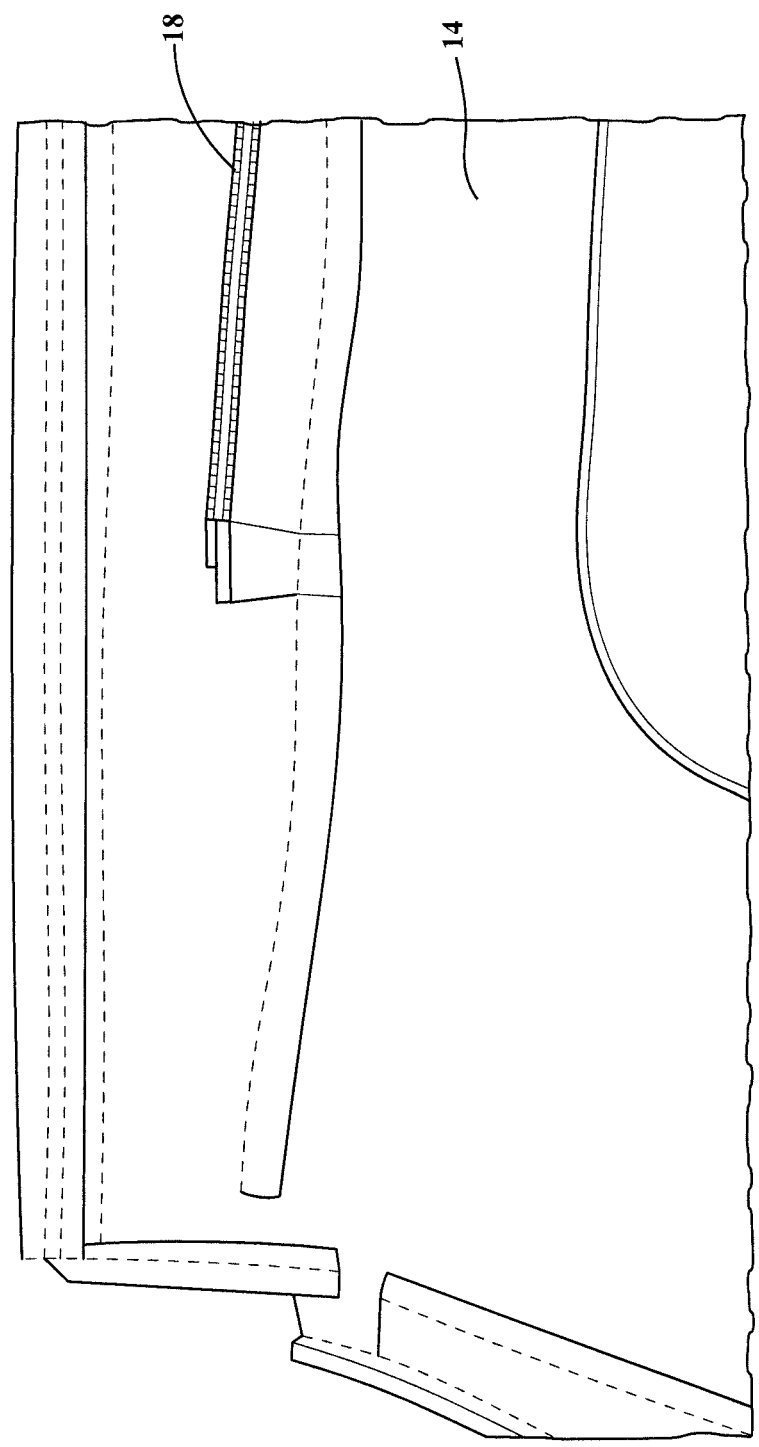
FIG. 2 is an elevation view of a second half of the zipper connected to a quarter window used for connecting the window to the deck side strip/foldable roof of FIG. 1.

Referring generally to FIGS. 1-4, a typical zipper, shown generally at 10, is connected to a deck side strip/foldable roof 12 and a window 14, e.g., a quarter window. Such conventional windows with zippers are problematic. The zipper 10 can be connected to the foldable roof 12 and the window 14 by a first seam of a first half 16 and can be connected to the window 14 through the use of a second seam of a second half 18. The zipper start location is critical in relation to the corresponding start on the window and yet variation is common such as at least +/−10 millimeters of variation. This is caused by sewing tolerances during manufacturing and other manufacturing issues. In addition, the placement of the zipper 10 on the deck side strip is critical to the corresponding zipper half on the window 14 and yet variation is common such as at least +/−10 millimeters of variation. Another issue with typical zipper systems is that the alignment of the zipper to the quarter window 14 can vary, such as at least +/−5 millimeters of variation, and does not align perfectly with a "V" notch indicator in the window fabric reinforcement. In particular, there is misalignment with the second seam/zipper and the concentric window fabric reinforcement in the corner area of the window 14. FIG. 1 illustrates a conventional first half 16 of a zipper on a foldable roof 12 having a zipper start location that can vary by at least +/−5 mm from the edge. FIG. 2 illustrates a conventional second half 18 of a zipper on a window 14 having a zipper start location that can vary by at least +/−5 mm.

Figure 3:
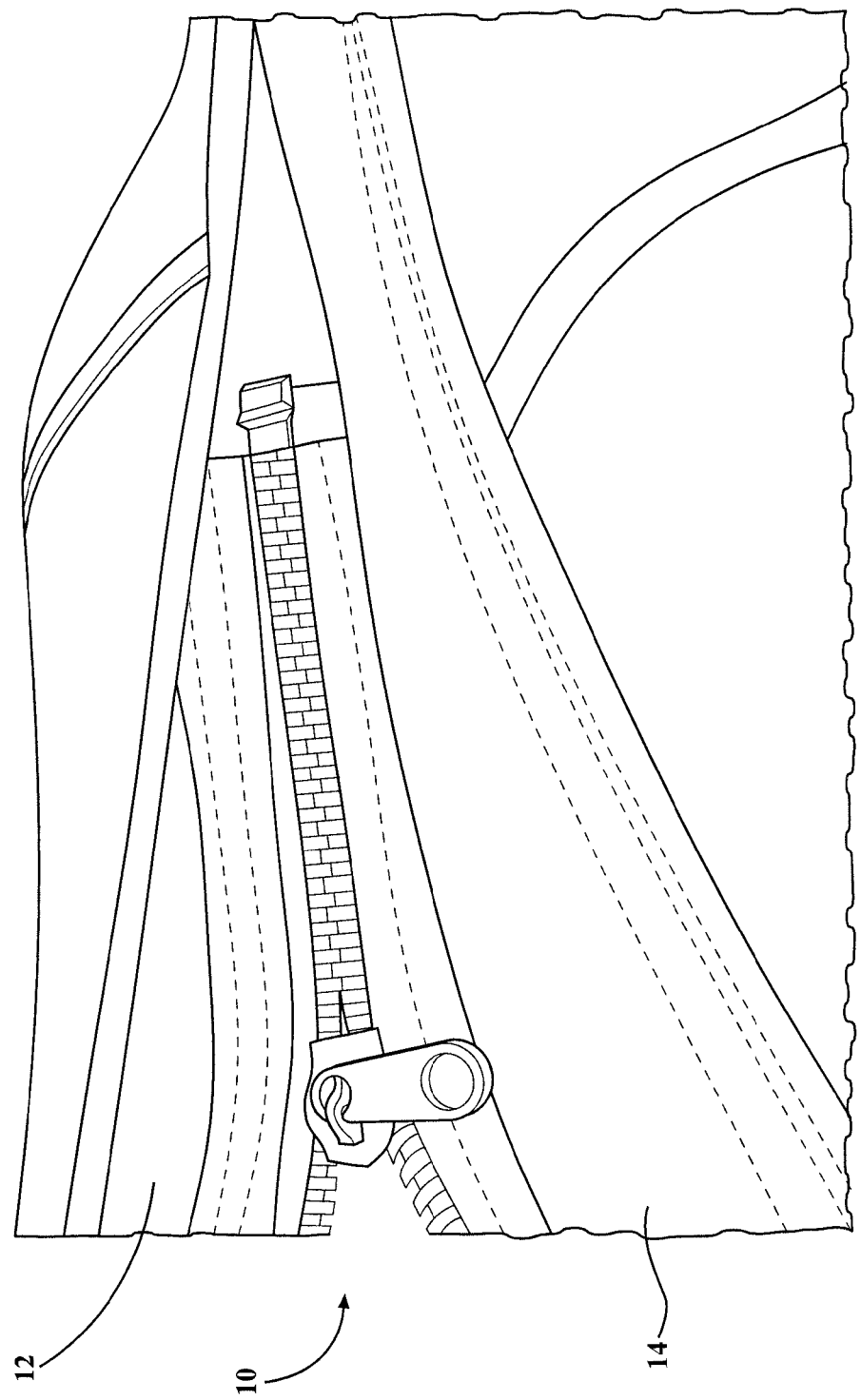
FIG. 3 is a perspective view of the first half of the zipper of FIG. 1 connected to the second half of the zipper of FIG. 2 along a straight portion.
Figure 4:
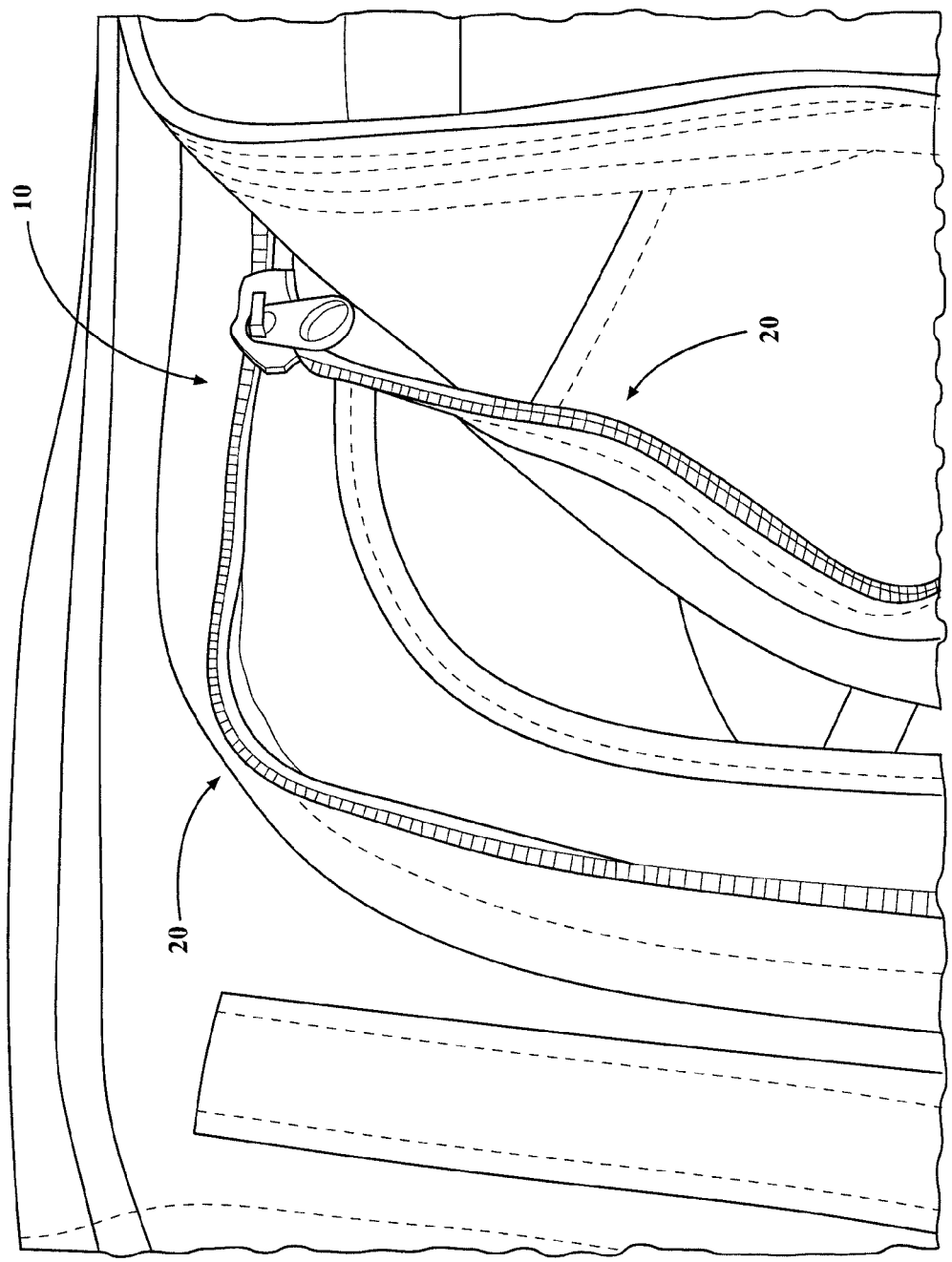
FIG. 4 is a rear side perspective view of a curved portion of the quarter window and the foldable roof of FIGS. 1-3 showing the zipper as it nears the curved portion as the zipper is zipped closed.

FIG. 3 illustrates installation of the window 14 zipper start into the deck side box end of the foldable roof 12. This can be difficult, compounded by the variations and misalignment of these features, resulting in the zipper teeth to skipping, thereby making the zipper 10 motion efforts high. Further, any variations of the zipper manufacturing alignment can result in high zipper 10 efforts around the corner portions, e.g., around the upper rear corner depicted in FIG. 4, shown generally at 20, resulting in installation difficulty of the window 14.

Referring generally to FIGS. 5-15, there is provided a zipper less removable window assembly, shown generally at 100, connected to a vehicle 11. The zipper less removable window assembly 100 includes a plurality of removable windows, shown generally at 102, having a plurality of window attachments, where the plurality of removable windows 102 includes a rear window 104, a left quarter window 106, and a right quarter window 108. The plurality of window attachments allows for selectively connecting the plurality of removable windows 102 to a foldable, stowable roof when it is desired to close off the vehicle interior from the outside environment.

Figure 5:
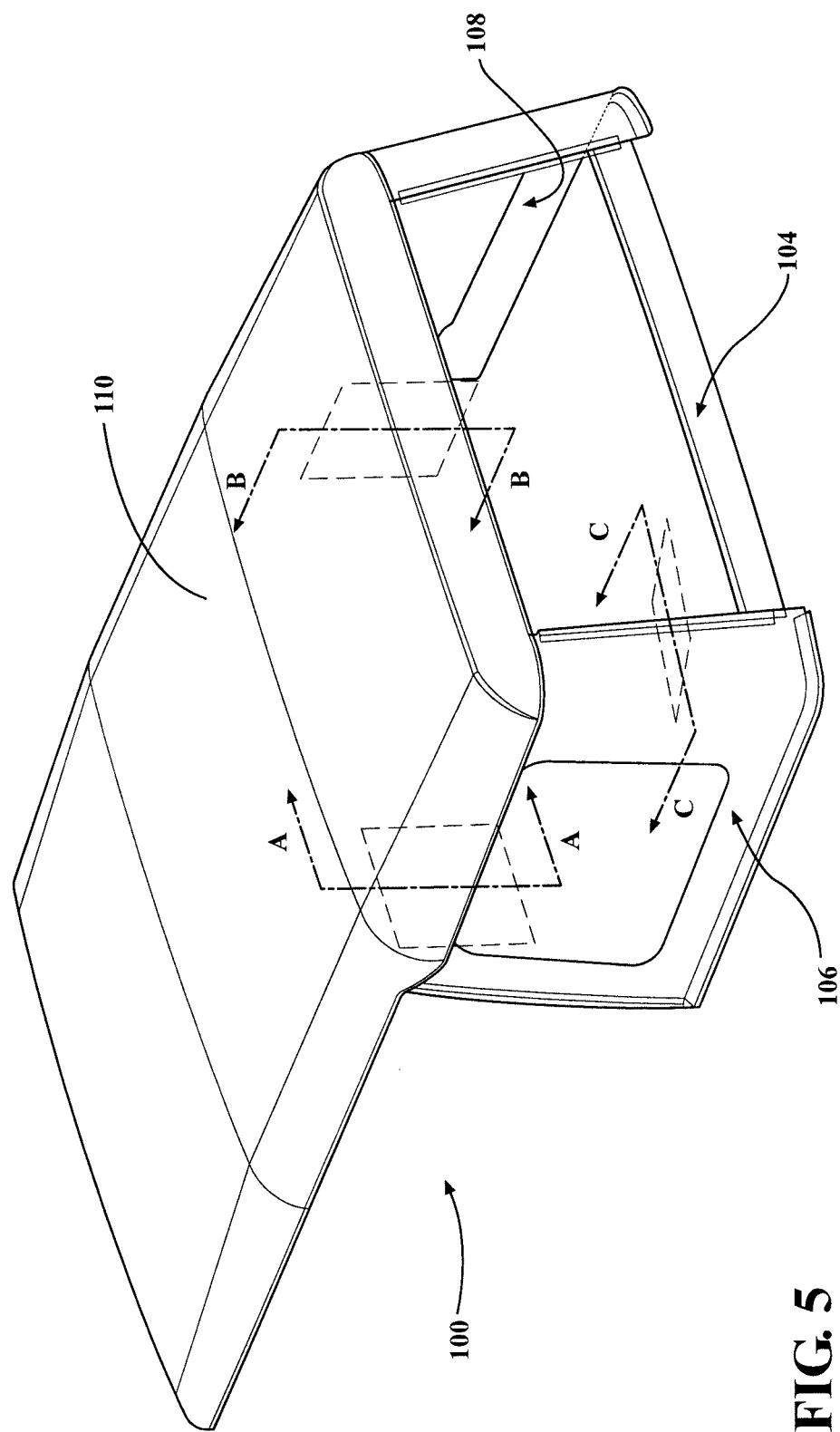
FIG. 5 is a schematic for a vehicle incorporating zipper less removable windows, for selectively connecting a foldable roof and removable windows, according to the present invention.

Referring more particularly to FIG. 5 is a schematic incorporating a foldable, stowable roof 110 connected to the zipper less removable window assembly 100 without the use of zippers. The plurality of removable windows 102 are connectable to the foldable, stowable roof 110 and to the vehicle 11 using the plurality of window attachments having no zippers.

Referring more particularly to FIG. 6, FIG. 6 is an enlarged sectional view taken along section A-A of FIG. 5 depicting the left quarter window 106 coupled to the foldable, stowable roof 110. The left quarter window 106 is a zipper less removable window that connects to the vehicle and connects to the top deck 110a curved area of the foldable, stowable roof 110 and connects to a deck side strip 116. The left quarter window 106 has a quarter window glass 112, most preferably, made of PVC. A quarter window carrier 114 is connected along the upper longitudinal edge of the quarter window glass 112. Most preferably, a longitudinal recess or notch 113 is provided in the quarter window carrier 114 and the quarter window glass 112 is affixed to one or more abutting surfaces in the recess, e.g., using adhesive and/or a film adhesive, most preferably, sewing and/or combinations thereof. Preferably, the quarter window carrier 114 is formed of molded plastic, e.g., composite material, reinforced fibers, etc.

The quarter window carrier 114 has a first channel portion, shown generally at 115, that is generally C-shaped. The first channel portion 115 is open on at least one end to slidably receive a bulb portion of a first 'P' welt retainer therein. A deck side strip 116 of fabric is connected to the top deck 110a of the foldable, stowable roof 110, most preferably, sewn to the top deck 110a at one end, and is connected to the first 'P' welt retainer 118 toward the other end. The deck side strip 116 is wrapped around the first 'P' welt retainer 118 and connected thereto, e.g., using adhesive and/or, most preferably, sewing the first 'P' welt retainer 118 in a pocket formed by the deck side strip 116. The first channel portion 115 of the quarter window carrier 114 is suitably sized to allow selective sliding of the elongated channel 115 along the length of the first 'P' welt retainer 118 and to retain the first 'P' welt retainer 118 longitudinally within the channel 115 while preventing undesirable lateral movement of the first 'P' welt retainer 118 out of the channel 115, including, moving laterally out of the channel 115.

The quarter window carrier 114 further has a second channel portion 119 that is generally U-shaped forming an elongated open channel that is generally angled downward and outward from the first channel portion 115. The end of the top deck 110a is connected to a top deck retainer 120 and binding top deck 122 portion. The top deck retainer 120 is selectively received within the second channel portion 119. When it is desired to connect the quarter window glass 112 to the foldable, stowable roof 110, the top deck 110a is folded down over the outward side of the quarter window carrier 114 and the top deck retainer 120 is snapped into the second channel portion 119. When it is desired to remove the quarter window glass 112, an operator disengages the top deck retainer 120 from the second channel portion 119. Preferably, the quarter top deck retainer 120 is formed of molded plastic, e.g., composite material, reinforced fibers, etc.

The right quarter window 108 and corresponding features are substantially mirror image to the left quarter window 106 and corresponding features.

Referring more particularly to FIG. 7, FIG. 7 is an enlarged sectional view taken along section B-B of FIG. 5 depicting the rear window 104 coupled to the foldable, stowable roof 110. The rear window 104 is a zipper less removable window that connects to the vehicle and connects to a rear valence top deck 132 curved rear area of the rear top deck 110b of the foldable, stowable roof 110. The rear window 104 also connects to a rear side strip 128. The rear window 104 has a rear window glass 124, most preferably, made of PVC. A rear window carrier 126 is connected along the upper longitudinal edge of the rear window glass 124. Most preferably, a longitudinal recess or notch 125 is provided in the rear window carrier 126 and the rear window glass 124 is affixed to one or more abutting surfaces in the recess, e.g., using adhesive and/or a film adhesive.

The rear window carrier 126 has a third channel portion, shown generally at 127, that is generally C-shaped. The third channel portion 127 is open on at least one end to slidably receive a bulb portion of a second 'P' welt retain therein. The rear side strip 128 of fabric is connected to the rear top deck 110b of the foldable, stowable roof 110, most preferably, sewn to the rear top deck 110b at one end, and is connected to the second 'P' welt retainer 130 toward the other end. The rear side strip 128 is wrapped around the second 'P' welt retainer 130 and connected thereto, e.g., using adhesive and/or sewing the second 'P' welt retainer 130 in a pocket formed by the rear side strip 128. The third channel portion 127 of the rear window carrier 126 is suitably sized to allow selective sliding of the elongated channel 127 along the length of the second 'P' welt retainer 130 and to retain the second 'P' welt 130 longitudinally within the channel 127 while preventing undesirable lateral movement of the second 'P' welt retainer 130 out of the channel 127, including, moving laterally out of the channel 127.

The end of the rear top deck 110b is connected to a rear valance top deck 132. Most preferably, an end of the rear valance top deck 132 and an end of the rear side strip 128 are sandwiched between an end of the rear top deck 110b and a liner of the upper horizontal rear support bar of the vehicle, and connected together, e.g., sewn together.

The rear window carrier 126 further has a fourth channel portion 134 that is generally U-shaped forming an elongated open channel that is generally angled downward and outward from the third channel portion 127. The lower end of the rear valance top deck 132 is connected to a rear top deck retainer 136 and rear binding top deck 138 portion. The rear top deck retainer 136 is selectively received within the fourth channel portion 134. When it is desired to connect the rear window glass 104 to the foldable, stowable roof 110, the rear valance top deck 132 is folded down over the rearward side of the rear window carrier 126 and the rear top deck retainer 136 is snapped into the fourth channel portion 124. When it is desired to remove the rear window glass 104, an operator disengages the rear top deck retainer 134 from the fourth channel portion 134. Preferably, the rear window carrier 126 and rear binding top deck 138 is formed of molded plastic, e.g., composite material, reinforced fibers, etc.

Referring more particularly to FIG. 8, FIG. 8 is an enlarged sectional view taken along section C-C of FIG. 5 depicting the left quarter rear window 106 coupled to the rear window 104 toward the left rear corner of the vehicle. A rear window side carrier 140 is connected along the vertical edge of the rear window glass 124. Most preferably, an elongated recess or notch 141 is provided in the rear window side carrier 140 and the rear window glass 124 is affixed to one or more abutting surfaces in the recess, e.g., using adhesive and/or a film adhesive. The left quarter window 106 has a quarter window panel 144 of fabric connected to a rear quarter window retainer 142. The rear quarter window retainer 142 is received in a fifth channel portion 143 formed in the rear window side carrier 140 that is generally U-shaped forming an elongated open channel to selectively receive and retain the elongated rear quarter window retainer 142 therein. Preferably, the rear window side carrier 140 and/or rear rear quarter window retainer 142 is formed of molded plastic, e.g., composite material, reinforced fibers, etc.

The right hand side of the rear window 104 coupled to the right quarter window 108 and all of the corresponding features are substantially mirror image to the left quarter window 106 and corresponding features coupled to the rear window 104 and corresponding features depicted in FIG. 8.

Figure 10:
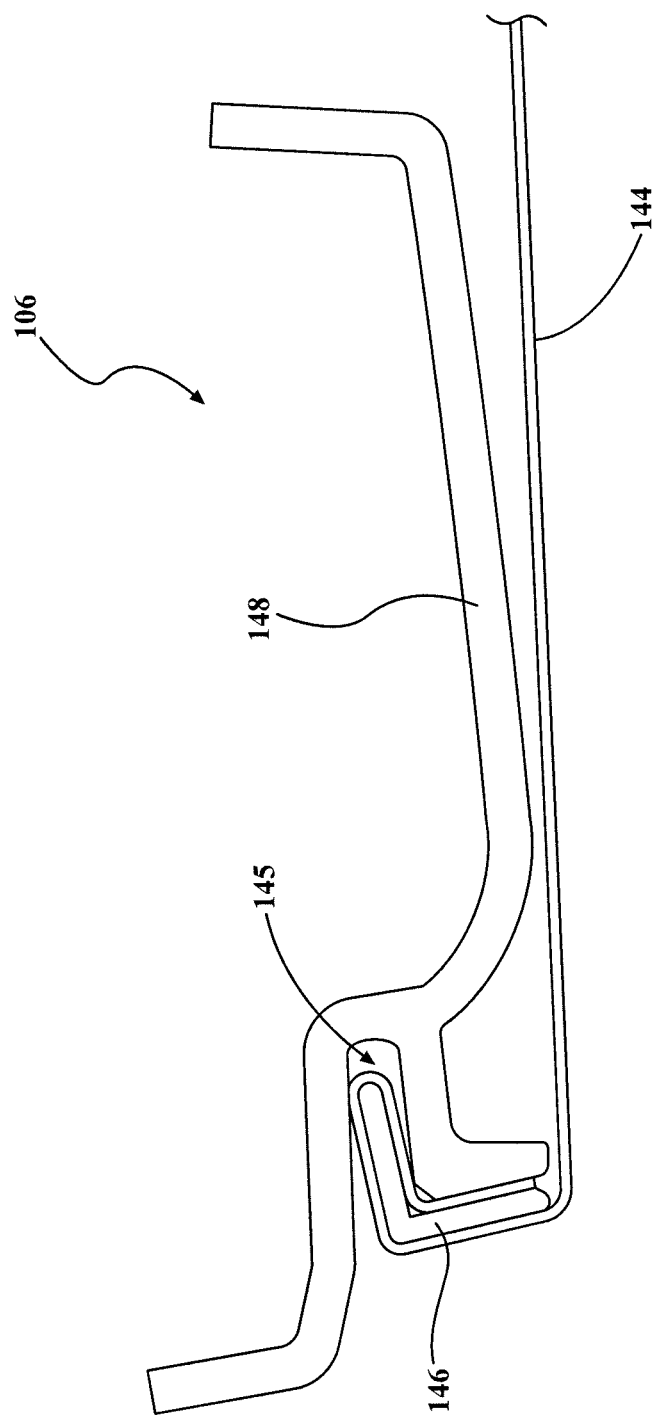
FIG. 10 is an enlarged sectional view taken along section D-D of FIG. 9, according to the present invention.
Figure 11:
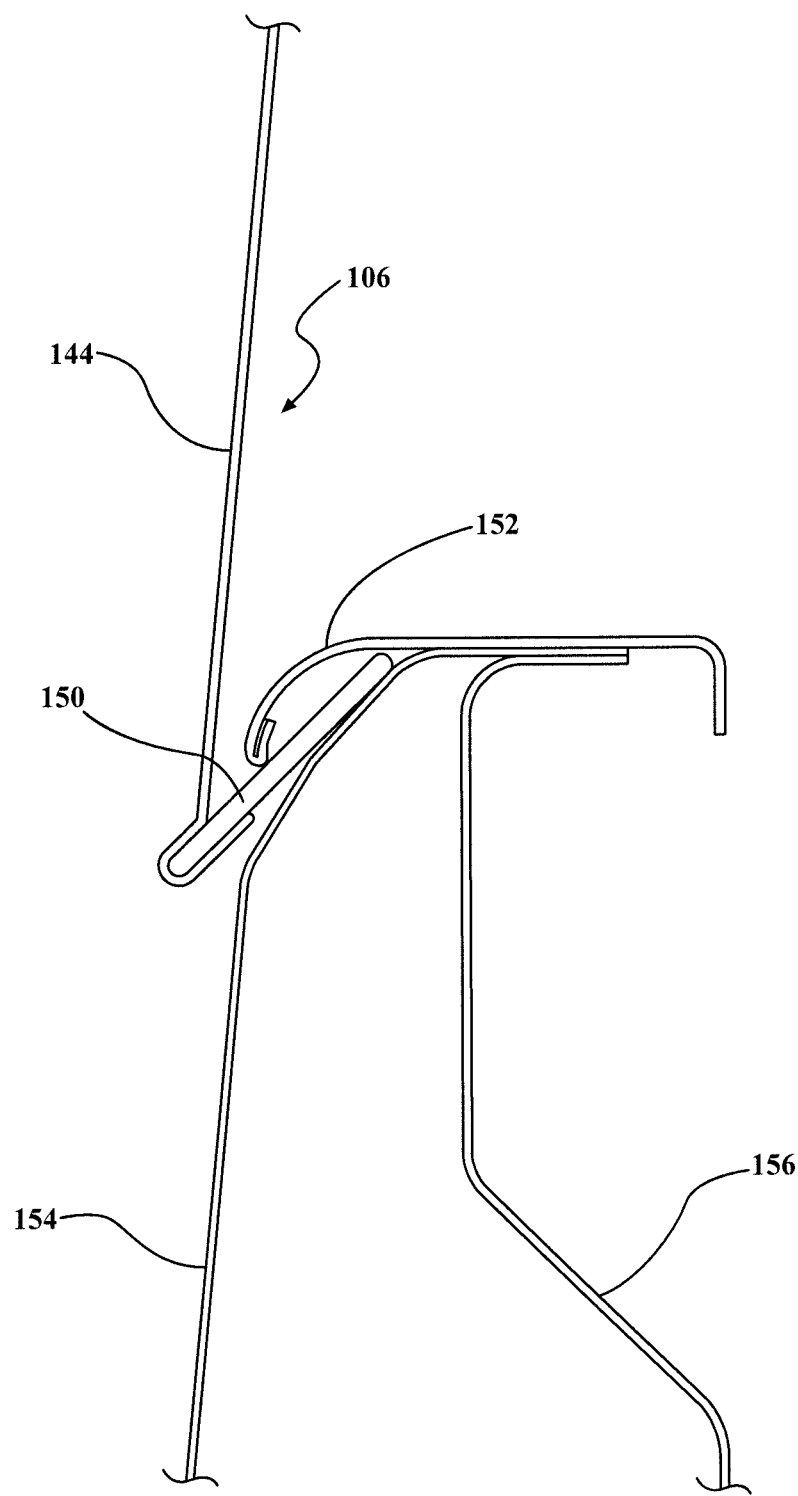
FIG. 11 is an enlarged sectional view taken along section E-E of FIG. 9, according to the present invention.
Figure 12:
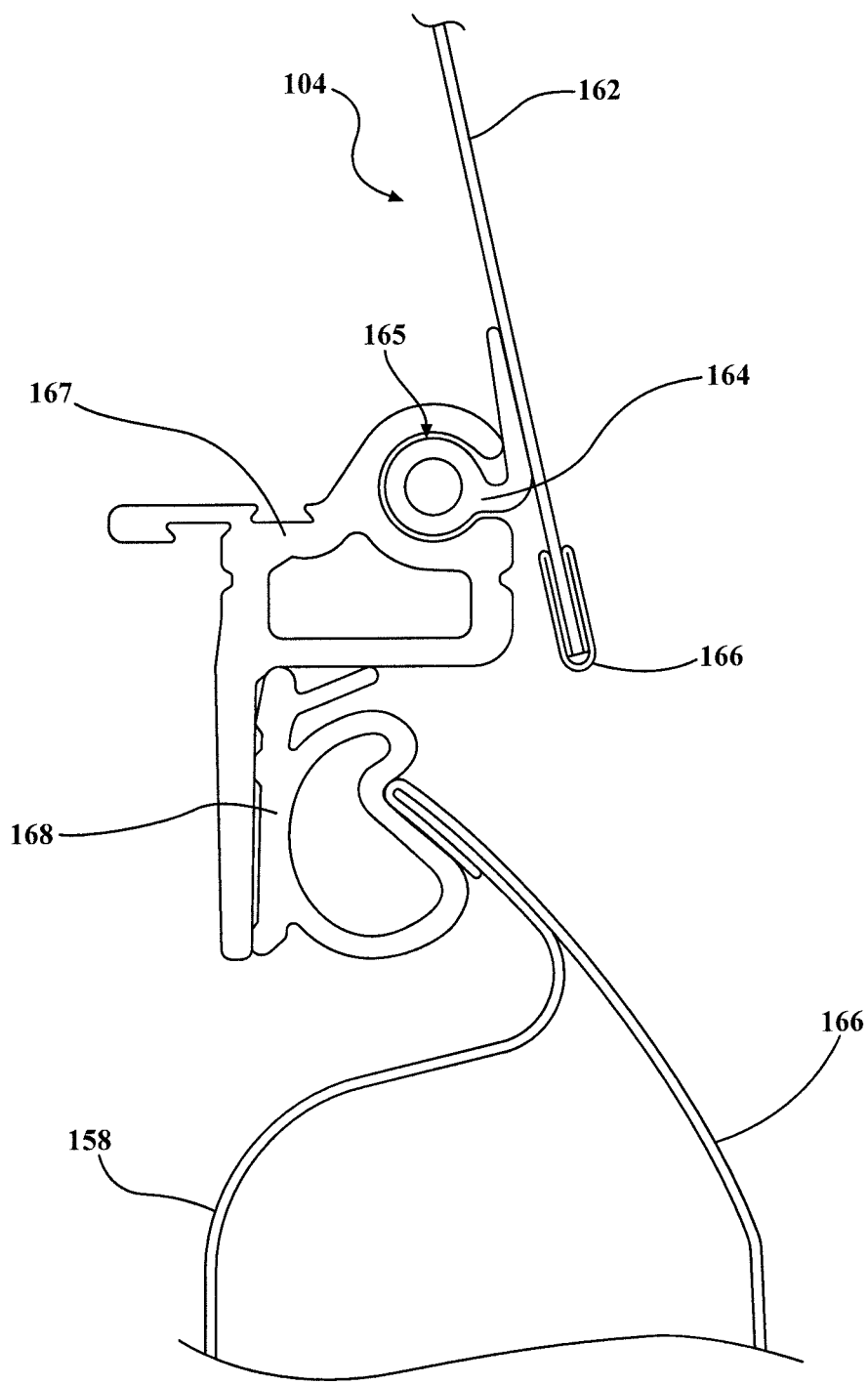
FIG. 12 is an enlarged sectional view taken along section F-F of FIG. 9, according to the present invention.
Figure 13:
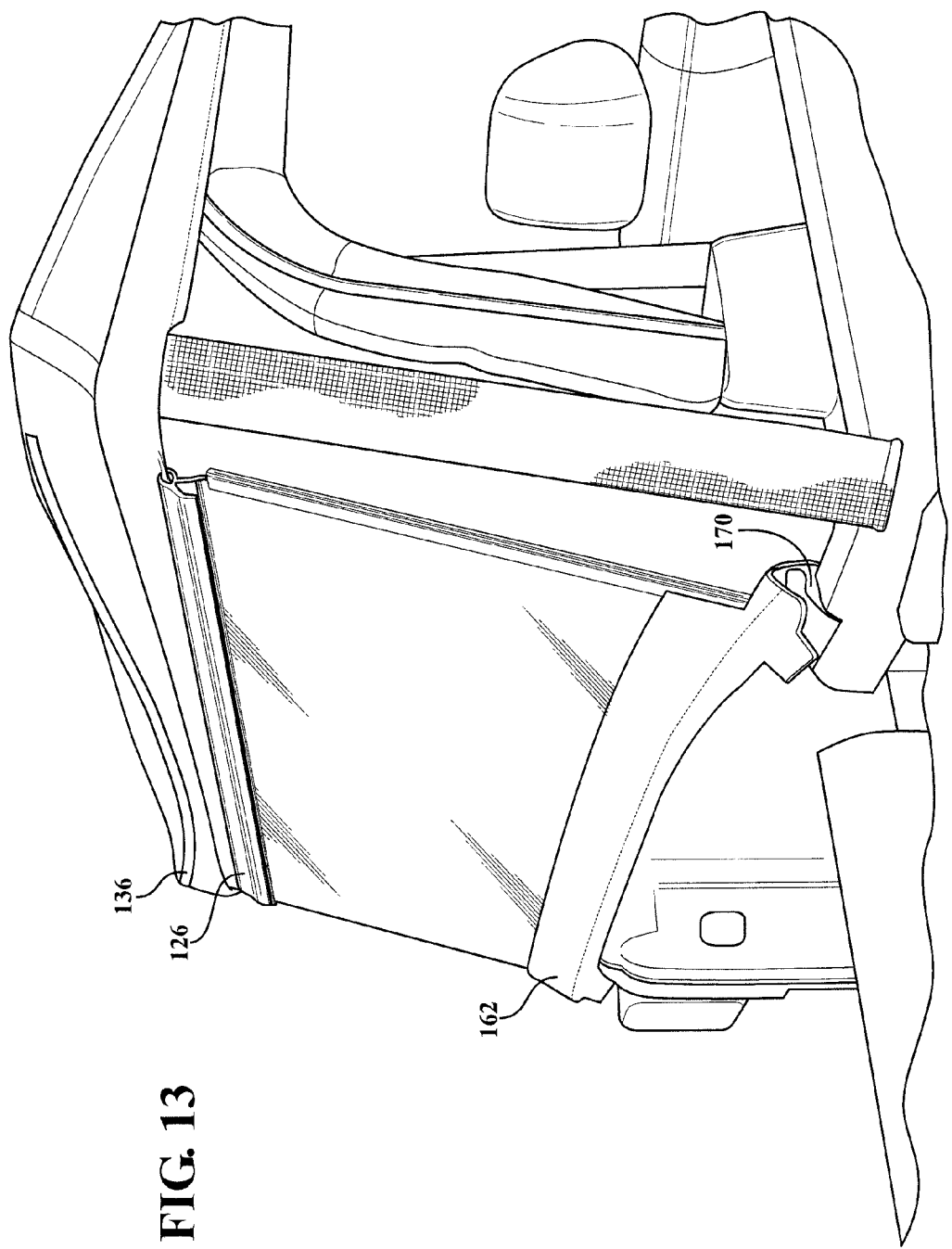
FIG. 13 is a rear right side perspective view of a rear window carrier slid onto a rear deck valance, according to the present invention.
Figure 14:
FIG. 14 is a front side perspective view of a quarter window carrier slid onto the deck side strip, according to the present invention.
Figure 15:
FIG. 15 is a rear left side perspective view of an installed rear window and a quarter window connected to the foldable roof, according to the present invention.

FIG. 9 is a schematic for the vehicle of FIG. 5 identifying additional cross sections depicted in FIGS. 10-12.

Referring more particularly to FIG. 10, FIG. 10 is an enlarged sectional view taken along section D-D of FIG. 9 depicting the left quarter rear window 106 coupled to a removable door rail 148. This provides the vertical connection along the front leading edge of the left quarter window 106 adjacent the rear edge of the door of the vehicle. The quarter window panel 144 of the left quarter window 106 is wrapped around and connected to a front quarter window retainer 146, e.g., using adhesive and/or sewing the front quarter window retainer 146 in a pocket formed by the quarter window panel 144 leading edge. The front quarter window retainer 146 is L-shaped and elongated. A sixth channel portion 145 that is in the removable door rail 148 that is generally U-shaped forming an elongated open channel to selectively receive and retain one of the legs of the L-shaped front quarter window retainer 146.

The right quarter window 108 and right removable door rail and corresponding features are substantially mirror image to the left quarter window 106 and removable door rail 147 and corresponding features depicted in FIG. 10.

Referring more particularly to FIG. 11, FIG. 11 is an enlarged sectional view taken along section E-E of FIG. 9 depicting the quarter window panel 144 of the left quarter window 106 connected, e.g., by adhesive and/or sewing a quarter window belt retainer 150. The quarter window belt retainer 150 is located along the bottom of the left quarter window 106 for engaging between, and being retainable by, a belt rail 152 of the vehicle body and a quarter panel outer 154 of the vehicle body. The belt rail 152 is connected to the quarter panel outer 154 and a quarter panel inner 156. The outward end of the belt rail 152 is curved to create a recess that is elongated for receiving and retaining the corresponding elongated quarter window belt retainer 150. This provides the horizontal connection along the bottom edge of the left quarter window 106 to the vehicle.

The right quarter window 108 and corresponding features are substantially mirror image to the left quarter window 106 and corresponding features depicted in FIG. 11.

Referring more particularly to FIG. 12, FIG. 12 is an enlarged sectional view taken along section F-F of FIG. 9 depicting the rear window 104 for selectively coupling to a rear panel swing gate inner 158. The rear window 104 comprises a rear window lower valence 162 connected to a third 'P' welt retainer 164 and a binding rear window 166. The seventh channel portion is generally C-shaped and open on at least one end to slidably receive a bulb portion of the third 'P' welt retainer 164 therein. The rear window lower valence 162 of fabric is connected to the 'P' welt retainer 164, e.g., using adhesive and/or sewn and/or sewing the third 'P' welt retainer 164 in a pocket formed by the fabric of the rear window lower valence 162. The seventh channel portion 165 of the tailgate bar 167 is suitably sized to allow selective sliding and retention of the elongated third 'P' welt retainer 164 longitudinally within the channel 165 while preventing undesirable lateral movement of the third 'P' welt retainer 164 out of the channel 165, including, moving laterally out of the channel 165. This provides the horizontal connection along the bottom edge of the rear window 104 adjacent to the rear swing gate of the vehicle. A swing gate weather strip 168, e.g., a bulb seal, is also provided to provide a sealing function between the tailgate bar 167 and a panel swing gate outer of the vehicle body 160.

Referring generally to FIGS. 5-15, in an embodiment of the present invention, the installation of the zipper less removable window assembly 10 will now be explained. When it is desired to close the removable rear window 104 a user aligns and slidably engages the rear window carrier 126 on the top of the window onto the rear side strip 128 where the second 'P' welt retainer 126 is located. The user slides the removable window 104 on the rear valance top deck 132 until the window is fully engaged across the length of the valance 132. The user pre-engages the tail gate bar 167 onto the third 'P' welt retainer 164 at the bottom of the rear window 104. The user slides the tail gate bar 167 on the front window 'P' welt retainer 164 until the tail gate bar 167 is fully engaged across the length of the third window 'P' welt retainer 164. Then the user rolls the tail gate bar 167 into the tail gate bar clip 170 on the vehicle body. The user aligns the rear window corner retainer, e.g., binding rear window 166 with the tailgate clip 170 and snaps the rear window corner retainer into the tailgate clip. If the quarter windows do not require installation, the top deck 110b/132 can then be installed at the rear window 104, as explained in greater detail below.

The installation of a quarter window will now be explained, e.g., left side quarter window 106. When it is desired to close the removable left quarter window 106 (and/or right rear quarter window 108) a user aligns the quarter window carrier 114 on the top of the quarter window onto the deck side strip 116 at the upper rear corner. The user slides the quarter window carrier 114 along the deck side strip 116 until the left quarter window 106 is fully engaged along the length of the deck side strip 116. The user pre-engages the front quarter window retainer 146 into the removable door rail 148 until the front quarter window retainer 146 is fully engaged into the removable door rail 148. The user then tucks the upper quarter window flaps between the deck side strip 116 and the top deck 110a at the front, e.g., toward direction of vehicle hood. The user aligns and engages the top deck retainer 120 to a quarter window upper front corner retainer. Then aligns and engages the top deck retainer 120 to the quarter window carrier 114 from the front corner across the top of the window. The top deck retainer 120 is engaged to the quarter window carrier 114 along the entire length. The user folds down the roof edge 110.

The user then aligns and inserts the quarter window belt retainer into the vehicle body belt rail at the lower front corner, e.g., in the direction toward vehicle hood, until the quarter window belt retainer is fully inserted into the vehicle body belt rail 152. The user aligns and engages the quarter window retainer 150 into the vehicle body belt rail 152 at a lower front corner of the quarter window 106. The user inserts the quarter window retainer 150 until the quarter window retainer 150 is fully engaged into the vehicle body belt rail 152.

The user aligns and engages the rear quarter window retainer 142 into the rear window side carrier 140. The user aligns and engages the quarter rear belt rail retainer 150 into the vehicle body belt rail 152 at the lower rear corner of the vehicle.

The installation of the top deck at the rear window will now be explained. The user aligns and engages the rear top deck retainer 136 into the rear window carrier 126 at the upper corner, e.g., upper right corner on the rear of the vehicle. The user engages the rear top deck 136 retainer into the rear window carrier 126 along the entire length thereof.

In the fully installed position, the top deck is folded down over the top of the removable windows to help create a weather tight seal.

When it is desired to open at least one of the windows the steps described above can be facilitated in reverse to disconnect and remove the window(s) from the foldable, stowable roof.

It is understood that one or more removable windows can be selectively installed and removed. By way of non-limiting example, when it is desired by the user that the rear window be removed the quarter windows can selectively remain connected to the foldable, stowable roof.

The removable window having the zipper less attachment design of the present invention facilitates the opening and closing of the removable window. Accordingly, there is a significant benefit to the positioning of the attachment devices and along all the edges of the removable windows that are zipper less.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A zipper less removable window assembly for a vehicle, comprising
    a rear window that is removable;
    at least two quarter windows that are removable and selectively connected to said rear window and to a body of said vehicle;
    a top deck connected to a deck side strip, said top deck connected to a roof of said vehicle;
    a rear top deck connected to a rear side strip, said rear top deck connected to the roof;
    a first 'P' welt retainer connected to said deck side strip;
    a second 'P' welt retainer connected to said rear side strip;
    a quarter window carrier having a first channel portion slidably connected to said first 'P' welt retainer to connect said quarter windows to said top deck;
    a rear window carrier having a third channel portion slidably connected to said second 'P' welt retainer for connecting said rear window to said rear top deck;
    a third 'P' welt retainer connected to said rear window;

a tailgate bar selectively connected to said vehicle, said tailgate bar having a seventh channel portion slidably connected to said third 'P' welt retainer to connect said rear window to the vehicle body; and a quarter window belt retainer connected to said quarter windows to selectively connect said quarter windows to the vehicle body.

2. The zipper less removable window assembly for a vehicle of claim 1, wherein the quarter window carrier further comprises, a recess, each of said quarter windows connected to a respective quarter window carrier within said recess by adhesive and/or sewing;

a second channel portion, said second channel portion selectively receiving and retaining a top deck retainer that is connected to said top deck further connecting said top deck to said quarter windows.

3. The zipper less removable window assembly for a vehicle of claim 1, wherein the rear window carrier further comprises, a recess, said rear window connected to said rear window carrier within said recess; and a fourth channel portion, said fourth channel portion selectively receiving and retaining a rear deck retainer that is connected to said a rear valance top deck, wherein said rear valance top deck is connected to said rear top deck, further connecting said rear top deck to said rear window.

4. The zipper less removable window assembly for a vehicle of claim 1, wherein said tailgate bar further comprises, a swing gate weatherstrip provided to provide a sealing function between said tailgate bar and a panel swing gate outer of said vehicle body; and a tailgate clip on said body of the vehicle, said tailgate bar selectively connected to said tailgate clip for connecting said tailgate bar to said vehicle.

5. The zipper less removable window assembly for a vehicle of claim 1, wherein said rear window further comprises a rear window glass;

a rear window side carrier having a notch, said rear window side carrier connected to said rear window glass;

a fifth channel portion formed in said rear window side carrier, said fifth channel portion selectively receiving and retaining a respective rear quarter window retainer connected to each of said quarter windows to vertically connect said quarter windows to said rear window.

6. The zipper less removable window assembly for a vehicle of claim 1, wherein each of said quarter windows further comprises a quarter window panel;

a front quarter window retainer connected to said quarter window panel;

wherein said front quarter window retainer is selectively connected within a sixth channel formed in a removable door rail to vertically connect the front edge of said quarter windows to said vehicle.

7. The zipper less removable window assembly for a vehicle of claim 1, wherein said quarter window belt retainer is received and retained between a quarter panel outward and belt rail on said vehicle body to provide a horizontal connection along the bottom edge of the quarter windows to said body of the vehicle.

8. The zipper less removable window assembly for a vehicle of claim 1, wherein said deck side strip and rear side strip are fabric and wrap around a bulb portion of said first 'P' welt retainer and second 'P' welt retainer, said quarter window carrier and rear window carrier in sliding engagement with said bulb portions, respectively.

9. The zipper less removable window assembly for a vehicle of claim 1, wherein said first channel portion is open on at least one end and retains a bulb portion of said first 'P' welt retainer longitudinally within said first channel portion while preventing undesirable lateral movement of said first 'P' welt retainer out of said first channel portion, including, moving laterally out of said first channel portion.

10. The zipper less removable window assembly for a vehicle of claim 1, wherein said third channel portion is open on at least one end and retains a bulb portion of said second 'P' welt retainer longitudinally within said third channel portion while preventing undesirable lateral movement of said second 'P' welt retainer out of said third channel portion, including, moving laterally out of said third channel portion.

11. The zipper less removable window assembly for a vehicle of claim 1, wherein said removable rear window and quarter windows have no zippers.

12. The zipper less removable window assembly for a vehicle of claim 1, wherein said rear window and at least two quarter windows are polyvinyl chloride.

13. A zipper less removable window assembly for a vehicle, comprising a rear window that is removable;

at least two quarter windows that are removable;

a top deck connected to a top deck retainer and to a deck side strip, said top deck connected to a roof of said vehicle;

a rear top deck connected to a rear side strip and to a rear valance top deck, said rear top deck connected to the roof;

a rear deck retainer connected to said rear valance top deck;

a first 'P' welt retainer connected to the deck side strip;

a second 'P' welt retainer connected to the rear side strip;

a quarter window carrier having a first channel portion slidably connected to said first 'P' welt retainer to connect said quarter windows to said top deck;

a second channel portion formed in said quarter window carrier, said second channel portion selectively receiving and retaining said top deck retainer further connecting said top deck to said quarter windows;

a rear window carrier having a third channel portion slidably connected to said second 'P' welt retainer for connecting said rear window to said rear top deck;

a fourth channel portion formed in said rear window carrier, said fourth channel portion selectively receiving and retaining said rear deck retainer further connecting said rear top deck to said rear window;

a third 'P' welt retainer connected to said rear window;

a tailgate bar selectively connected to said vehicle, said tailgate bar having a seventh channel portion slidably connected to said third 'P' welt retainer to connect said rear window to the vehicle body; and a quarter window belt retainer connected to said quarter windows to selectively connect said quarter windows to the vehicle body.

14. The zipper less removable window assembly for a vehicle of claim 13, wherein said tailgate bar further comprises, a swing gate weatherstrip provided to provide a sealing function between said tailgate bar and a panel swing gate outer of said vehicle body; and a tailgate clip on said body of the vehicle, said tailgate bar selectively connected to said tailgate clip for connecting said tailgate bar to said vehicle.

15. The zipper less removable window assembly for a vehicle of claim 13, wherein said rear window further comprises
   a rear window glass;
   a rear window side carrier having a notch, said rear window side carrier connected to said rear window glass;
   a fifth channel portion formed in said rear window side carrier, said fifth channel portion selectively receiving and retaining a respective rear quarter window retainer connected to each of said quarter windows to vertically connect said quarter windows to said rear window.

16. The zipper less removable window assembly for a vehicle of claim 13, wherein each of said quarter windows further comprises
   a quarter window panel;
   a front quarter window retainer connected to said quarter window panel;
   wherein said front quarter window retainer is selectively connected within a sixth channel formed in a removable door rail to vertically connect the front edge of said quarter windows to said vehicle.

17. The zipper less removable window assembly for a vehicle of claim 13, wherein said deck side strip and rear side strip are fabric and wrap around a bulb portion of said first 'P' welt retainer and second 'P' welt retainer, said quarter window carrier and rear window carrier in sliding engagement with said bulb portions, respectively.

18. The zipper less removable window assembly for a vehicle of claim 13, wherein said first channel portion is open on at least one end and retains a bulb portion of said first 'P' welt retainer longitudinally within said first channel portion while preventing undesirable lateral movement of said first 'P' welt retainer out of said first channel portion, including, moving laterally out of said first channel portion.

19. The zipper less removable window assembly for a vehicle of claim 13, wherein said third channel portion is open on at least one end and retains a bulb portion of said second 'P' welt retainer longitudinally within said third channel portion while preventing undesirable lateral movement of said second 'P' welt retainer out of said third channel portion, including, moving laterally out of said third channel portion.

20. A zipper less removable window assembly for a vehicle, comprising
   a rear window that is removable;
   a left quarter window that is removable;
   a right quarter window that is removable;
   a plurality of window attachments for connecting said windows to a vehicle body;
   a first 'P' welt retainer connected to said deck side strip;
   a second 'P' welt retainer connected to said rear side strip;
   a quarter window carrier having a first channel portion slidably connected to said first 'P' welt retainer to connect said quarter windows to a deck side strip;
   a top deck connected to said deck side strip and to said quarter window carrier, said top deck connected to a roof of said vehicle;
   a rear window carrier having a third channel portion slidably connected to said second 'P' welt retainer for connecting said rear window to a rear side strip;
   a rear top deck connected to said rear side strip, said rear top deck connected to the roof;
   a third 'P' welt retainer connected to said rear window;
   a tailgate bar selectively connected to said vehicle, said tailgate bar having a seventh channel portion slidably connected to said third 'P' welt retainer to connect said rear window to the vehicle body; and
   a quarter window belt retainer connected to said quarter windows to selectively connect said quarter windows to the vehicle body;
   wherein said first channel portion is open on at least one end and retains said first 'P' welt retainer longitudinally within said first channel portion while preventing undesirable lateral movement of said first 'P' welt retainer out of said first channel portion; and
   wherein said third channel portion is open on at least one end and retains said second 'P' welt retainer within said third channel portion while preventing undesirable lateral movement of said second 'P' welt retainer out of said third channel portion.

* * * * *